Figure 1:
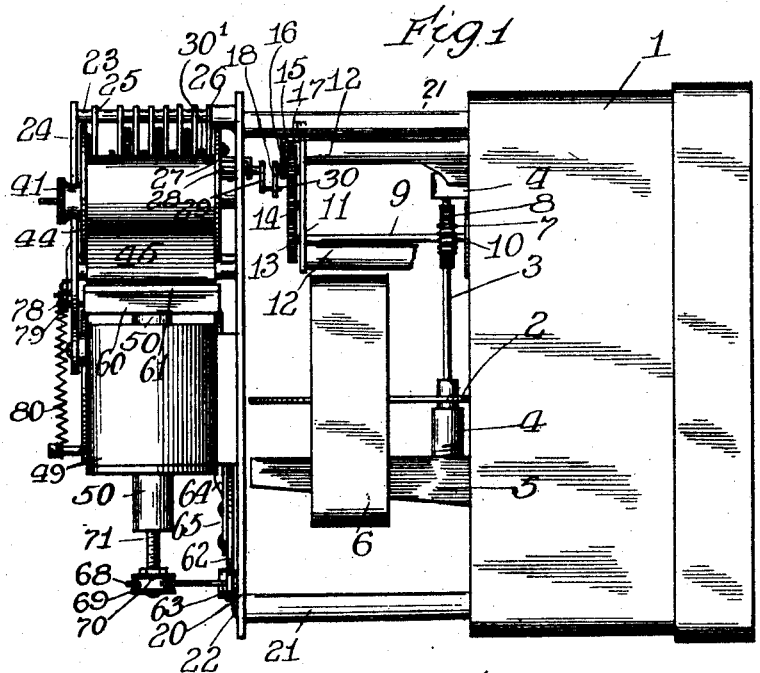

F. F. KINNEY.
PRINTING METER.
APPLICATION FILED AUG. 6, 1908.

987,725.

Patented Mar. 28, 1911.
2 SHEETS—SHEET 1.

Witnesses:
R. A. White
Harry R. White

Inventor:
Frank F. Kinney.
By Brown & Williams Attys

F. F. KINNEY.
PRINTING METER.
APPLICATION FILED AUG. 6, 1908.
987,725.
Patented Mar. 28, 1911.
2 SHEETS—SHEET 2.
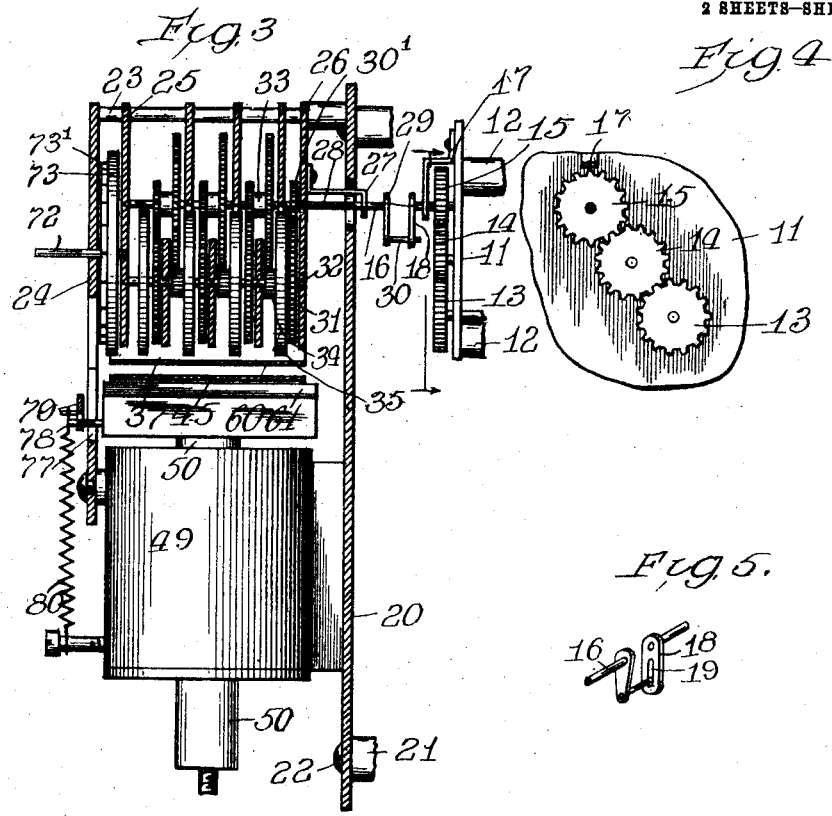
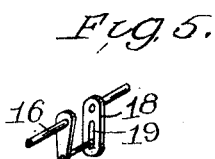
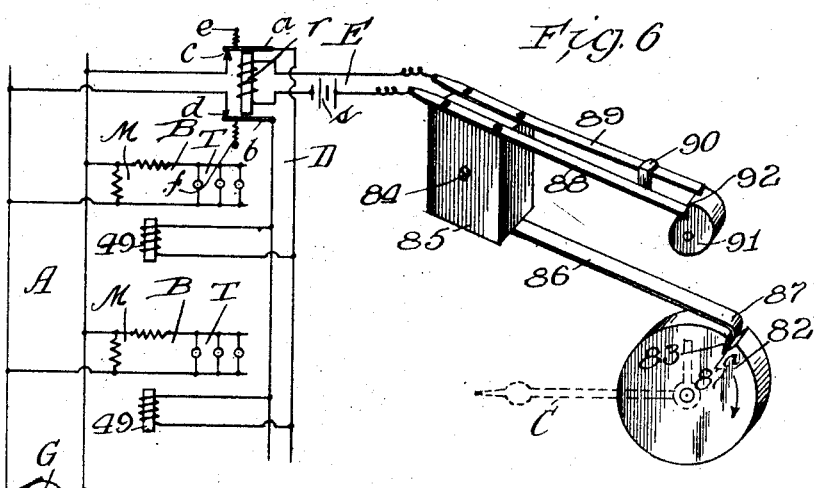
Witnesses:
R. A. White
Harry L. White
Inventor:
Frank F. Kinney.
By Brown & Williams Atty's

UNITED STATES PATENT OFFICE.

FRANK F. KINNEY, OF CHICAGO, ILLINOIS, ASSIGNOR, BY DIRECT AND MESNE ASSIGNMENTS, TO MINERALLAC ELECTRIC COMPANY, OF CHICAGO, ILLINOIS, A CORPORATION OF ILLINOIS.

PRINTING-METER.

987,725.	Specification of Letters Patent.	Patented Mar. 28, 1911.

Application filed August 6, 1908. Serial No. 447,214.

*To all whom it may concern:*

Be it known that I, FRANK F. KINNEY, a citizen of the United States, residing at Chicago, in the county of Cook and State of Illinois, have invented a certain new and useful Improvement in Printing-Meters, of which the following is a full, clear, concise, and exact description, reference being had to the accompanying drawings, forming a part of this specification.

My invention relates to printing meters, particularly to printing wattmeters.

In taking readings from a plurality of meters it is desirable that these readings be taken simultaneously, in order to save time, and automatically, in order to insure accuracy. Meter reading is becoming to be quite a problem at the present day, and the expenses involved in taking individual readings of a great number of meters is considerable, and a great deal of error results.

The main object of my invention, therefore, is to provide improved means for automatically obtaining permanent readings simultaneously from a plurality of meters. This I accomplish electrically by mechanism controlled by a single time device, such as a clock. The time interval of taking the readings can be made anything desired by adjustment of the clock mechanism. In a large building, for instance, where a great number of meters are employed, a single clock could control the taking of the readings from all the meters, and the clock could be at any distance from the meters and connected therewith only through wires.

My invention is also of great utility and convenience in testing work where it is essential that readings be taken simultaneously from a plurality of testing instruments at certain time intervals, as, for example, every hour.

I provide a reading attachment which may be applied to meters of different construction, and which comprises integrating mechanism for printing wheels and an electro-magnet controlling the operation of a printing pad, inking ribbon, and record paper being suitably arranged and caused to travel between the pad and printing wheels. The various electro-magnets of any number of meters can be connected with a common circuit, current flow through which is controlled by suitable clock mechanism placed at any distance from the meters.

Figure 2:
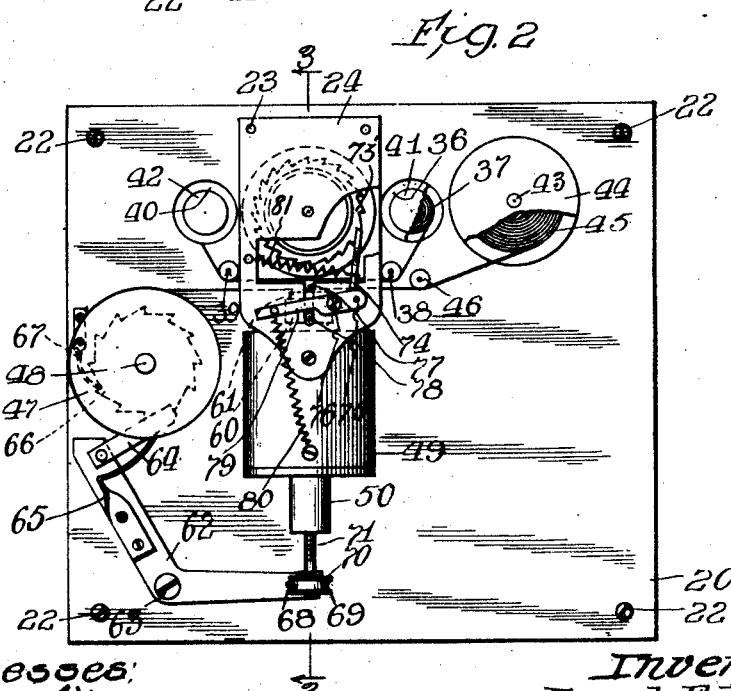

In the accompanying drawings, which illustrate the construction and application of my invention, Figure 1 is a side elevation of the meter showing my improved reading attachment applied thereto, Fig. 2 is a front view of the attachment, Fig. 3 is an enlarged sectional view taken on line 3—3, Fig. 2, Fig. 4 shows the gear train intervening between the meter movable part and the attachment, Fig. 5 is a perspective view showing the coupling means for connecting the meter movable part with the attachment, and Fig. 6 is a diagrammatic representation of the clock mechanism and circuit controlled thereby.

In Fig. 1 I have represented the meter 1, having the damping disk 2 mounted on the spindle 3, suitably pivoted in bearings 4. A shelf 5 supports the damping magnet 6 which spans the damping disk. The spindle has a worm thread 7 which meshes with the gear 8 carried on the arbor 9 journaled between the supporting plate 10 and the supporting plate 11, which latter plate is secured to the ends of posts 12. The arbor 9 at its front end carries the gear 13 which meshes with the intermediate transmission gear 14, suitably pivoted to the plate 11, and this gear in turn meshes with the gear 15 mounted on the arbor 16, which is pivoted in the plate 11, and in the bracket 17 extending downwardly from said plate, as shown. The front end of the arbor 16 carries the coupling crank 18 having a coupling slot 19. The main supporting plate 20 for the printing attachment is adapted to be secured to the posts 21, as by means of screws 22. Extending from this supporting plate are the posts 23 carrying on their front ends the front supporting plate 24. On said posts there is also mounted a front intermediate supporting plate 25 and the rear intermediate supporting plate 26. Pivoted in said intermediate plates and in the brackets 27 extending from plate 26 is the arbor 28, at whose rear end is carried the coupling crank 29 from whose end extends the crank pin 30, which extends into coupling slot 19 when the attachment is applied to the meter so that movement of the coupling crank 18 by the meter will be transmitted to the arbor 28.

On this arbor 28 is secured a driving pinion 30' which meshes with the gear 31 mounted on arbor 32, which pivots in and between the intermediate plates 25 and 26. On the arbor 28 are also mounted carry-over gear structures 33 which coöperate with carrying gearing 34 on the shaft 32. On the shaft 32 there are also mounted the units, tens, hundreds, thousands, and so on, number wheels 35, each having ten digits, these digits being in the form of raised printing characters. I do not claim the construction of this integrating mechanism, but its operation is clearly understood by those skilled in the art, continuous rotation of arbor 28 resulting in rotation first of the units wheel, then carry-over operations from one units wheel to the other, every complete revolution of one order wheel resulting in a tenth revolution of the succeeding order wheel.

As best shown in Fig. 2, a feed drum 36 carries a roll of inking ribbon 37, the ribbon passing over the guide rods 38, 39, to the intake drum 40, these drums having knurled heads 41, 42, respectively, whereby they may be readily turned to advance the ribbon. The ribbon 37 passes by and a short distance from the printing wheels. Pivoted on the rod 43 is the spool 44 supporting the record paper roll 45, the paper passing over the guide rod or roller 46 parallelly under the inking ribbon and over the intake spool 47, the pivot rod 43 for the paper supply spool being extended upwardly from the supporting plate 20 at one side of the integrating mechanism and the pivot rod 48 for the intake spool extending from the plate 20 at the opposite side of the integrating mechanism. Below the integrating mechanism is mounted the electro-magnet core 49, this core containing a suitable winding, not shown. The armature 50 for the electro-magnet passes through the core, and at its upper end carries the frame 60 supporting the inking pad 61, the pad extending parallel to the printing line of the printing wheels, and normally a short distance below the record paper. When the electro-magnet is energized, its armature, with the pad frame is carried upwardly, and the pad 61 presses the record paper and ribbon against the type characters on the printing wheels and the record paper receives an impression. I also provide means whereby the movement of the armature operates ratchet mechanism for controlling the operation of the intake spool 47 so that said spool is rotated a sufficient distance after each printing operation to carry a clear section of paper into the printing field. This ratchet mechanism comprises the bell crank lever 62 pivoted at its elbow 63 to the supporting plate 20. A pawl 64 pivoted at the left end of this lever is engaged by the spring 65 carried by said lever to be pressed against the ratchet wheel 66 secured to the intake drum 47 concentric with its pivot rod 48. A detent spring or pawl 67 is secured to the supporting plate 20 and engages the ratchet wheel. At the other end of the lever, a pin 68 extends upwardly and engages in the peripheral groove 69 of the cylindrical nut 70 which threads on the threaded extension 71 from the armature. This threading engagement of the nut with the end 71 allows longitudinal movement of the nut on said stem and adjustment thereby of the ratchet mechanism. With this arrangement, when the armature is moved upwardly to cause printing, the lever 62 is rotated and the pawl 64 carried over the ratchet wheel to engage the next tooth, so that when the armature returns to its normal position, the lever is restored and the pawl 64 carried to cause rotation of the ratchet wheel, and thereby rotation of the intake spool to advance the record paper. Pivoted between the supporting plates 24 and 25 on the arbor 72 is the wheel 73 having printing characters 1 to 24 on its periphery indicative of hours, and the wheel is arranged so that these characters will be in the printing line with the characters on the integrating mechanism printing wheels. Secured to the hour wheel is a ratchet wheel 73' whose teeth are engaged by a pawl 74 carried at one end of the lever 75, which is pivoted at an intermediate point 76 to the plate 24 below the hour wheel. In this plate 24 there is a vertical slot 77 through which extends a pin 78 carried by the printing frame 60. The arm 79 of the lever extends to the left, and above and in the path of the pin 77, while the end of said arm is connected by a spring 80 with some stationary part of the frame, as for instance, the core frame, as shown. Now when the armature is attracted upwardly, the pin 77 is carried therewith and rotates the lever 75 to drop the pawl 74 into engagement with the next tooth. When the electro-magnet becomes deënergized, the weight of the armature and the force of the spring 80 on pin 77 cause the armature to be quickly restored, during which restoration the hour wheel 73 is given one advancement by the pawl 74, as the lever 79 is rotated by spring 80. A spring 81 connects the pawl 74 with the supporting plate 24, as shown, and assists to hold the pawl in engagement with the teeth of the ratchet wheel 73'.

In Fig. 6 I have diagrammatically illustrated clock controlled contact mechanism and the energizing circuits for the printing electro-magnets controlled thereby. The clock mechanism is represented diagrammatically at C and comprises a wheel 82 rotated one revolution per hour, this wheel having a single cam notch 83. Pivoted at 84 to some suitable stationary part of the clock mechanism is the supporting block 85 of insulating material carrying at its lower end a cam arm 86 having the cam end 87, which rides over the surface of the wheel 82 and which drops into the slot 83 at each revolution of the wheel 82, which is once each hour. At the top of the block are mounted two parallel contact springs 88 and 89, the contact spring 89 being slightly longer than the spring 88. The spring 88 has a contact arm 90 extending upwardly and laterally therefrom with its lateral end disposed over the spring 89 to be engaged thereby when said spring 89 is raised, thereby causing electrical contact between said springs. Coöperating with the ends of these contact springs is a snail cam 91, suitably connected with the clock mechanism to be driven at the rate of one revolution per minute. The position of the tip 92 of this snail cam is such that when the end 87 of arm 86 drops into the slot 83, the spring 88 will have dropped from the tip 92 to the lowest point of the snail cam, but the end of spring 89 is retained on the tip so that the contact arm 90 will make contact with the spring 89 to electrically connect these springs together. This position of the springs 88 and 89 is only for a short instant, as the snail cam is of small diameter and rotates quite rapidly, so that the spring 89 soon drops from the cam tip 92 to again disengage from the contact arm 90, both springs then engaging the lower part of the snail cam, and practically parallel with each other. The cam wheel 82 then carries around the groove 83 to raise the end 87 and to rotate the block 85, thereby swinging the springs 88 and 89 to raise them clear of the snail cam 91. Therefore, once each hour the end 87 will drop and the springs 88, 89 will be brought into electrical contact, but the period of contact is very short.

At the left of Fig. 6 are shown the circuits which the contact mechanism controls. A represents a supply circuit fed by the generator G which may be either an alternating current or a direct current generator. Connected with said main circuit are a plurality of branch supply circuits B for supplying current to translating devices T, and in each of these circuits there is included a meter M. Also associated with each meter is a reading attachment, of which the electro-magnet 49 is diagrammatically illustrated. The windings of all of the electro-magnets are shown as connected in bridge of the controlling circuit D, which connects with the armatures $a$, $b$, of the relay $r$. The contacts $c$, $d$, for the armatures connect with the limbs of the main circuit A, as shown, the armatures being normally held from their contacts by springs $e$ and $f$. The winding of relay $r$ is in the circuit E connected with and controlled by the contact springs 88, 89, and including a source of current $s$. As shown the clock C is indicating the hour and the end 87 of arm 86 has dropped into the cam slot 83 and spring 88 is dropped from the cam tip 92, the springs being therefore in electrical contact to close the circuit E and to cause energization of relay $r$. The armatures $a$ and $b$ are therefore attracted against their contacts $c$ and $d$ to connect the reading attachment circuit D with the main circuit A to cause actuation of the electro-magnets 49 to take the readings of the meters. After an instant of closure of this circuit D for just a sufficient length of time to cause the brief energization of the printing electro-magnets the spring 89 leaves the cam tip 92 and circuit E is opened and relay $r$ is deënergized to cause disconnection of circuit D from the main circuit.

The clock controlled contact mechanism for the printing magnet circuits can, of course, be at any distance from the meters and the meters themselves can be separated any distance, but at certain predetermined intervals all the meters are simultaneously read and the readings are almost certain to be correct. No work is necessary at the meters after the automatic reading thereof by the reading attachment, as all the steps necessary for taking a reading are performed automatically, as for example, the restoration of the electro-magnet armature and the advancement of the record paper. The record paper receives an imprint from the integrating mechanism printing wheels indicative of the electrical measurement by the meters, and the paper receives a simultaneous imprint from the hour wheel indicative of the time, each electrical measurement reading having, therefore, associated with it a character indicative of the time when such reading was taken. All these records are obtained at each meter by the use of a single electro-magnet, and only two wires are necessary from the controlling block to the various printing attachment electro-magnets.

Instead of having the printing circuits controlled automatically by the time controlled contact mechanism, it is evident that some mechanical switch, such as a push button, could be substituted for the contact mechanism in circuit E. The circuit arrangements could also be different from those shown.

Having thus described my invention I desire to secure the following claims by Letters Patent:

1. In combination, a plurality of indicating instruments having movable members, printing wheels for each instrument connected with the movable members to be actuated thereby in proportion to the actuations of said movable members, record-mechanism for each instrument, an electromagnet for each instrument for associating the record-mechanism with the printing wheels, a common energizing circuit for said electromagnets, and time-controlled contact-mechanism at a distance from the indicating instruments for controlling said circuit to cause simultaneous actuation of said electromagnets.

2. In combination, a plurality of recording instruments having movable members, integrating mechanism for each instrument having integrating printing wheels connected to be driven by the movable members in proportion to the actuations thereof, record receiving mechanism for each instrument, an electro-magnet for each instrument for associating the record receiving mechanism with the printing wheels, a common circuit for all of the electro-magnets, a main circuit for supplying said common circuit, contact mechanism at a distance from the instruments for controlling the connection of the electro-magnet circuit with the supply circuit, and clock mechanism for controlling the operation of the contact mechanism to cause simultaneous readings to be taken at the instruments at predetermined intervals.

3. In combination, a plurality of measuring instruments, a printing attachment for each instrument, an electro-magnet at each instrument for controlling the printing mechanism, a common circuit for the electromagnets, a main supply circuit, a relay controlling the connection of said main supply circuit with the electro-magnet circuit, and contact mechanism at a distance from the instruments for controlling a circuit for said relay to cause simultaneous actuation of said electromagnets.

4. In combination, a plurality of measuring instruments, a printing attachment for each instrument, an electro-magnet at each instrument for controlling the printing mechanism, a common circuit for the electromagnets, a main supply circuit, a relay controlling the connection of said main supply circuit with the electro-magnet circuit, contact mechanism at a distance from the instruments for controlling a circuit for said relay, and means for electrically causing operation of the contact mechanism to periodically close the relay circuit whereby simultaneous readings of the printing attachments are taken periodically.

5. In combination, a main current supply circuit, a plurality of branch circuits leading from said main circuit each to translating devices, an electricity meter in each branch circuit, printing mechanism for each meter for printing the measurement values thereof, an electro-magnet for each printing mechanism, a supply circuit with which the electro-magnets are all connected, and contact mechanism for controlling the connection of said electro-magnet supply circuit with the main circuit whereby the electromagnets may all be simultaneously actuated and simultaneous readings taken at the meters.

6. In combination, a main current supply circuit, a plurality of branch circuits leading from said main circuit each to translating devices, an electricity meter in each branch circuit, printing mechanism for each meter for printing the measurement values thereof, an electro-magnet for each printing mechanism, a supply circuit with which the electro-magnets are all connected, and time controlled contact mechanism for controlling the connection of the electro-magnet circuit with the main circuit whereby said electro-magnets are periodically simultaneously energized and the printing mechanisms periodically actuated.

7. In combination, a main current supply circuit, a plurality of branch circuits leading from said main circuit each to translating devices, an electricity meter in each branch circuit, printing mechanism for each meter for printing the measurement values thereof, an electro-magnet for each printing mechanism, a supply circuit with which the electro-magnets are all connected, a relay controlling the connection of the electromagnet circuit, and contact mechanism at a distance from the meters for electrically controlling a circuit for said relay.

8. In combination, an electricity meter having a rotatable armature, integrating mechanism associated with the meter, printing members for said mechanism adapted to be actuated by the armature proportionately to the rotations thereof, an electromagnet to move a suitable record-receiving material against the printing wheels, and means for energizing said electromagnet at desired intervals, whereby a record is printed to indicate the sum of the actuations of the meter.

9. In combination, an electricity meter having a movable member, a printing attachment for the meter, integrating mechanism carried by the attachment and directly connected with said movable member, printing wheels for the integrating mechanism, a time-printing wheel associated with said printing wheels, an electromagnet adapted upon energization to carry a suitable record-receiving material against the printing wheels to receive a record, a pawl-and-ratchet mechanism controlled by the electromagnet to advance the record-receiving material after each printing operation, and additional pawl-and-ratchet mechanism actuated upon deënergization of said electromagnet to advance the time printing wheel.

10. In a printing attachment for electricity meters, the combination of integrating mechanism connected with the movable member of the meter to which the attachment is applied, printing wheels for the integrating mechanism, a printing ribbon adjacent the printing wheels, a supply spool and an intake spool for holding a suitable record-receiving strip, an electro-magnet adapted upon energization to carry the strip and ribbon against the printing wheels whereby the strip receives a printed record, a lever connected with the armature of said electro-magnet, a pawl carried by said lever, a ratchet wheel carried by the intake spool and engaged by the pawl, said ratchet lever being reciprocated upon operation of the electro-magnet to cause the pawl and ratchet mechanism to advance the intake spool after each printing operation.

11. In a printing attachment for electricity meters, the combination of integrating mechanism adapted for connection with a movable member of the meter to which the attachment is applied, record members for the integrating mechanism, record receiving mechanism adjacent the record members, an electro-magnet adapted upon energization to carry the record receiving mechanism against the record members to receive a record, an auxiliary record member, a ratchet wheel connected with said member, a pawl engaging said ratchet wheel, a lever carrying said pawl, said lever being engaged by the electro-magnet armature upon attraction thereof to set the pawl with respect to the ratchet wheel, and a spring for actuating said lever to cause the pawl to rotate the ratchet wheel upon the return of the armature to normal position, said spring assisting in restoring the armature to normal position.

12. In combination, an electricity meter having integrating mechanism, record members driven by the integrating mechanism, record receiving mechanism, an electro-magnet for associating the record receiving mechanism with the record members, a circuit for said electro-magnet, contact mechanism for said circuit, a clock for controlling said contact mechanism to periodically close the circuit whereby the electro-magnet is periodically energized to cause the record receiving mechanism to receive a record from the record members, an auxiliary time recording member at the meter, and means controlled by the electromagnet for causing actuation of said time recording member to associate a time record with each record taken from the record members.

13. In combination, an indicating instrument having a movable armature, a shaft driven by said armature, a clutch-crank carried by said shaft, an integrating attachment adapted to be readily brought into and out of association with said movable armature, a driving shaft extending from said integrating mechanism, a clutch-crank at the end of said shaft, one of said clutch-cranks being provided with a clutch-pin and the other with a slot for locking the two shafts together upon application of the integrating mechanism to the indicating instrument.

14. In combination, an electricity meter having a movable member, a printing attachment for the meter, a plurality of integrating wheels forming part of the attachment, coupling means for automatically connecting the integrating wheels with the movable member of the meter when the attachment is applied, printing wheels associated with the integrating wheels, a time-recording wheel associated with the printing wheels, record-receiving mechanism adjacent the printing wheels and the time-recording wheel, an electromagnet having an armature carrying said record-receiving mechanism, energization of said electromagnet causing the record-receiving mechanism to be applied to the printing wheels to receive a record indicative of the meter operation and of the time when the record was taken, a record-ribbon for the record-receiving mechanism, means for advancing said record-receiving ribbon upon deënergization of the electromagnet, and means for advancing the time-recording wheel upon deënergization of the electromagnet.

15. In combination, an electricity meter having a movable member, a detachable supporting frame carried by the meter, a plurality of totalizer printing wheels carried by the supporting frame, a coupling for automatically connecting the printing wheels with said movable member upon application of the supporting frame to the meter, record-receiving mechanism adjacent the printing wheels, and an electromagnet mounted on the supporting frame and having an armature supporting said record-receiving mechanism, energization of the electromagnet causing the record-receiving mechanism to be associated with the printing wheels to receive a record therefrom indicative of the meter operation.

16. In combination, an electricity meter, a coupling member driven by the meter at a rate proportional to the measurements to be recorded, a supporting plate adapted for attachment to the meter, a row of totalizer printing wheels supported from said plate, a companion coupling member extending from said printing wheels and adapted automatically to engage with the coupling member on the meter when the supporting plate is applied to the meter, record-receiving mechanism supported from the plate, and electromagnetic mechanism for associating said record receiving mechanism with the printing wheels to receive printing impressions indicative of the meter operation.

17. In combination, an electricity meter, a coupling member driven by the meter at a rate proportional to the measurements to be recorded, a supporting plate adapted for attachment to the meter, a row of totalizer printing wheels supported from said plate, a companion coupling member extending from said printing wheels and adapted automatically to engage with the coupling member on the meter when the supporting plate is applied to the meter, record-receiving mechanism supported from the plate, electromagnetic mechanism for associating said record-receiving mechanism with the printing wheels to receive printing impressions indicative of the meter operation, and a time-recording wheel for marking the record-receiving mechanism to indicate the time at which the records are taken from the meter recording wheels.

18. In combination, an electricity meter, a coupling member supported from the meter and adapted to be driven at a rate proportional to the actuations of the meter, a supporting frame adapted for attachment to the meter, a row of totalizer printing wheels mounted on said supporting frame, a companion coupling member connected with said printing wheels and adapted to automatically engage with the coupling member on the meter when the supporting frame is attached to the meter, whereby the meter-actuations are transferred to the printing wheels, a time-recording wheel mounted in the row with the meter-recording wheels, a record-receiving mechanism adjacent the printing wheels, and an electromagnet controlling the operation of said record-receiving mechanism to receive impressions from the meter-recording wheels and the time-recording wheel, said time-recording wheel being controlled by the operations of said electromagnet.

19. In combination, a meter, a plurality of record printing wheels connected with the meter, record-receiving mechanism, an electromagnet adapted upon energization to apply the record-receiving mechanism to the printing wheels to receive a record of the meter-operation, clock-controlled circuit mechanism for causing energization of said electromagnet at predetermined intervals, and a time-recording wheel associated with the meter-recording wheels, said time-recording wheel being controlled by the electromagnet after each record-printing operation to assume a printing position indicative of the time at which the next record will be printed.

20. In combination, a meter, a record-marking mechanism, an electromagnet controlling the operation of the record-marking mechanism to mark a record indicative of the meter-operation, and a time-recording member for associating a time-mark with each operation-mark on the record, the setting of said time-recording member being controlled by said electromagnet.

21. The combination of a plurality of indicating instruments provided each with a movable member, printing wheels for each instrument connected with the movable member to be actuated thereby in proportion to the actuations of said movable member, record-mechanism for each instrument, an electromagnet for each instrument adapted when energized to associate the record-mechanism with the printing wheels to make a record, a common energizing circuit for said electromagnets, and contact mechanism for closing said circuit to cause simultaneous operation of said electromagnets, whereby readings of said instruments are taken simultaneously at suitable intervals.

22. The combination of a plurality of electric meters, a rotatable armature for each meter, integrating mechanism connected with each armature to be actuated thereby in proportion to the actuations thereof, record-mechanism associated with each meter, an electromagnet for each meter to associate the record-mechanism with the integrating mechanism, whereby a record is made in accordance with the actuations of the armature, a common energizing circuit for said electromagnets, and a time-controlled switch for controlling said circuit to cause simultaneous actuation of said electromagnets.

23. The combination of a plurality of electric meters, a movable armature for each meter, integrating mechanism connected with each armature to be actuated thereby in proportion to the actuations thereof, record-mechanism associated with each meter, an electromagnet for each meter to associate the record-mechanism with the integrating mechanism, whereby a record is made in accordance with the actuations of the armature, and circuit-connections for said electromagnets to cause simultaneous actuation thereof.

In witness whereof, I hereunto subscribe my name this 4th day of August, A. D. 1908.

FRANK F. KINNEY.

Witnesses:
CHARLES J. SCHMIDT,
LEONARD W. NOVANDER.